(12) United States Patent
Levi et al.

(10) Patent No.: US 9,787,645 B2
(45) Date of Patent: Oct. 10, 2017

(54) USER PRIVACY PROTECTION METHOD AND SYSTEM

(71) Applicant: AVG Netherlands B.V., Amsterdam (NL)

(72) Inventors: Shaul Levi, Amsterdam (NL); Valery Kholodkov, Amsterdam (NL)

(73) Assignee: AVG Netherlands B.V., Amsterdam (NL)

( * ) Notice: Subject to any disclaimer, the term of this patent is extended or adjusted under 35 U.S.C. 154(b) by 0 days.

(21) Appl. No.: 14/720,007

(22) Filed: May 22, 2015

(65) Prior Publication Data

US 2015/0341322 A1 Nov. 26, 2015

Related U.S. Application Data

(60) Provisional application No. 62/001,815, filed on May 22, 2014.

(51) Int. Cl.
*H04L 29/06* (2006.01)
*G06Q 30/02* (2012.01)
*H04L 29/08* (2006.01)

(52) U.S. Cl.
CPC ..... *H04L 63/0414* (2013.01); *G06Q 30/0269* (2013.01); *H04L 63/0428* (2013.01);
(Continued)

(58) Field of Classification Search
CPC ............. H04L 63/0414; H04L 63/0428; H04L 63/0421; H04L 63/0435; H04L 63/045; H04L 67/02; H04L 67/306; G06Q 30/0296
See application file for complete search history.

(56) References Cited

U.S. PATENT DOCUMENTS

2002/0026345 A1* 2/2002 Juels ................. G06Q 30/02
705/80
2002/0124112 A1* 9/2002 Tso .................. G06Q 30/04
709/246
(Continued)

FOREIGN PATENT DOCUMENTS

WO WO0051031 A1 * 8/2000 ............. G06F 17/30

OTHER PUBLICATIONS

International Preliminary Report on Patentability Application No. PCT/US2015/032185, Filing Date, May 22, 2015, date of mailing Dec. 1, 2016.

*Primary Examiner* — Jung Kim
*Assistant Examiner* — Carlos M De Jesus Lassala
(74) *Attorney, Agent, or Firm* — Kramer Levin Naftalis & Frankel LLP (57) ABSTRACT

Methods and systems for facilitating communications between user computing devices and online entities (such as web sites, advertisers, and/or advertising networks or exchanges), and safeguarding user identifiable information and ad targeting data from those entities are provided. Communications sent from user computing devices and directed to the entities are intercepted, and those communications are processed to encrypt, or otherwise remove, user identifiable information therein. The processed communications are transmitted to the intended entities, targeting data calls are received from those entities for ad targeting data associated with users of those computing devices, and at least a portion of such ad targeting data is provided to the entities when certain predefined conditions are met.

12 Claims, 7 Drawing Sheets

(52) U.S. Cl.
CPC ........ *H04L 63/045* (2013.01); *H04L 63/0435* (2013.01); *H04L 67/02* (2013.01); *H04L 67/306* (2013.01)

(56) References Cited

U.S. PATENT DOCUMENTS

| | | |
|---|---|---|
| 2003/0210787 A1 | 11/2003 | Billhartz et al. |
| 2005/0154923 A1* | 7/2005 | Lok .................... H04L 63/0428 726/19 |
| 2009/0048977 A1 | 2/2009 | Aggarwal et al. |
| 2011/0161422 A1* | 6/2011 | Bender ............... G06F 21/6254 709/204 |
| 2011/0164749 A1* | 7/2011 | Natarajan ............. H04W 12/06 380/270 |
| 2012/0023570 A1* | 1/2012 | Gorodyansky ..... H04L 63/0407 726/12 |
| 2013/0062420 A1 | 3/2013 | Hamman et al. |
| 2013/0097664 A1 | 4/2013 | Herz et al. |

\* cited by examiner

USER PRIVACY PROTECTION METHOD AND SYSTEM

CROSS-REFERENCE TO RELATED PROVISIONAL APPLICATION

This application claims the benefit of U.S. Provisional Patent Application No. 62/001,815, filed on May 22, 2014, the disclosure of which is hereby incorporated herein by reference in its entirety.

COPYRIGHT NOTICE

Portions of the disclosure of this patent document contain materials that are subject to copyright protection. The copyright owner has no objection to the facsimile reproduction of the patent document or patent disclosure as it appears in the U.S. Patent and Trademark Office patent files or records solely for use in connection with consideration of the prosecution of this patent application, but otherwise reserves all copyright rights whatsoever.

FIELD OF THE INVENTION

The present invention generally relates to improvements in the protection of user privacy in Internet activities that involve online entities (such as advertisers), wherein user identifiable information in web communications transmitted from users to those entities is safeguarded by one or more trusted intermediary servers.

BACKGROUND OF THE INVENTION

Online advertising is a billion dollar industry. Ever since the dawn of the Internet, companies, ranging from mom and pop stores to established brands, have increasingly allocated large portions of their marketing resources to advertising over the web. And as technology continues to improve and more individuals have access to Internet-enabled computing devices, the Internet is increasingly becoming the predominant advertising medium to consumers.

Nowadays, any company wishing to advertise on the web can do so in a number of ways. As one option, it can contract with a content publisher, such as a web site or a mobile app developer, and have its ads presented on the site's web pages or in the mobile app when it is loaded on user devices. As another option, it can contract with a search engine firm (such as GOOGLE) and have its ads posted on the firm's search engine results pages. As yet another option, it can contract with an online advertising network or exchange and have its ads posted on web pages of sites partnered with the network. When a user visits such a site, for example, the site would retrieve ads from its advertisers' ad inventories (stored either locally on the site's own server or remotely on the advertisers' servers), and present them on its web pages to the visitor.

In the aforementioned online advertising arrangements, it is not uncommon for the advertisers to gain access to valuable consumer-related data over time, whether through the use of tracking technologies (e.g., cookies or code embedded in its ads) that identify users and monitor their activities on partner web sites or in mobile apps, or by purchasing the data directly from third party sources. This treasure trove of information includes not only ad targeting data (such as users' ages, genders, locations, occupations, interests, hobbies, recently submitted search engine keywords or phrases, etc.), but also personally identifiable information (such as the users' names, e-mail addresses, and Internet protocol ("IP") addresses). Armed with this resource, advertisers gain invaluable insight into the personal lives of consumers, which helps them tailor their marketing strategies differently for different people. That is, by leveraging this information, advertisers can present certain ads to certain consumers (e.g., NIKE sneaker ads to young male joggers or best-selling novels to avid fiction readers), and avoid delivering irrelevant ones (e.g., ads for ballet shoes or golf magazine subscriptions) that those consumers would likely not act on.

But while access to and use of such consumer-related data enables the advertising industry to run efficiently and profitably, it comes at the expense of user privacy. First, consumer activity tracking is invasive and thus can damage the public's trust in the Internet. Additionally, much of the accumulated personal information (such as names, addresses, etc.) are not required for ad targeting purposes; oftentimes, simply knowing that a certain user is female and enjoys knitting, for example, is sufficient to target highly relevant ads to her—there's no need for the user's name and residence. Furthermore, the information is often shared or sold in marketplaces that consumers have little or no control over and, if left unprotected, can fall into the hands of hackers or other untrustworthy actors, leading to possible misuse to the detriment of the general public.

SUMMARY OF THE INVENTION

Generally speaking, it is an object of the present invention to improve over conventional web-based advertising architectures by providing a user privacy protection system and process that safeguards user identifiable information and ad targeting data.

According to one embodiment, a user privacy protection method, involving communications between a computing device and an online entity, wherein a user of the computing device is registered with at least one computing device platform server for safeguarding of user data, is provided. The method includes receiving, at the at least one computing device platform server, a communication from the computing device directed to the online entity, analyzing, using the at least one computing device platform server, the communication for user identifiable information, generating, using the at least one computing device platform server, a unique value based on information regarding the user data, processing, using the at least one computing device platform server, the communication to replace the user identifiable information with the unique value, and transmitting, using the at least one computing device platform server, the processed communication to the online entity.

According to another embodiment, a user privacy protection system, involving communications between computing devices and online entities, wherein each user of each computing device is registered with the system for safeguarding of their user data, is provided. The system includes a memory configured to store the user data and a communication module configured to transmit and receive communications to and from the computing devices and online entities. The system also includes a control module configured to, for each communication received at the communication module from one of the computing devices and directed to one of the online entities, analyze the communication for user identifiable information, generate a unique value based on information regarding the user data corresponding to that computing device, process the communication to replace the user identifiable information with the unique value, and cause the communication module to transmit the processed communication to that online entity.

According to a further embodiment, a computer program product including a non-transitory medium storing computer executable program logic for protecting user privacy, involving communications between a computing device and an online entity, wherein a user of the computing device is registered with at least one computing device platform server for safeguarding of user data, is provided. The computer executable program logic is configured to cause at least one data processor of the at least one computing device platform server to receive a communication from the computing device directed to the online entity, analyze the communication for user identifiable information, generate a unique value based on information regarding the user data, process the communication to replace the user identifiable information with the unique value, and transmit the processed communication to the online entity.

In various embodiments, an exemplary trusted provider platform server interfaces with ad servers and user computing devices. The platform server acts as a bridge between ad servers and computing devices. Accordingly, all communications sent from the computing devices and directed to one or more of the ad servers first pass through the platform server. The platform server is additionally equipped with a user privacy protection system configured to process such communications (e.g., by removing all user identifiable information therein) prior to delivery to the ad servers. In this way, ad servers are stripped from their abilities to identify, track, and/or profile users, and thus have access only to their own advertising inventories—all user data, including user identifiable information and associated ad targeting data, is separately stored in (e.g., either locally in memory or remotely in one or more secure and accessible locations) and safeguarded by the platform server. In various embodiments, an ad server can request the platform server for access to some or all of the user data for ad targeting purposes, but may be granted only limited access rights subject to predefined conditions (e.g., only upon user consent).

Novel techniques are be employed to ensure that user identifiable information is hidden or removed therefrom, prior to transmission to intended online entities. In various embodiments, the user privacy protection system can be configured to embed or include a unique value, such as a secure cryptographic token, in each communication received from a user computing device. The secure cryptographic token can, for example, include a sequence of data that is unique for each received communication, and can be created by using a cryptographic algorithm, a secret key, and user data (such as the user's profile ID). The protection system can also correlate the created token with that user data for future reference. This results in an "opaque" communication that nevertheless includes user identifiable information (e.g., the user's profile ID), albeit masked by a secure encrypted value. Since the protection system (or more generally, the platform server) remains the sole master of the secret key, which is required to unlock the secure token, only the protection system can resolve the token to the user's profile ID.

When the intended online entity (e.g., ad server) receives the processed communication including such a secure token, it can extract the token therefrom and include it in its targeting data call to the protection system. In response, the protection system can identify the returned token, resolve it using the secret key, and look up the corresponding user profile ID to identify the target user. As long as the user consents to the entity's access to the user's ad targeting data, the protection system can transmit some or all of that ad targeting data to the entity accordingly. Again, since only ad targeting data (such as age, gender, recent or intended purchases, etc.), and not any personally identifiable information (such as name, address, or IP address) is sent to the entity, the entity has no way of identifying or tracking the user's online activities, but will nevertheless be able to target highly relevant ads to that user.

According to one embodiment, an exemplary secure cryptographic token generation process is provided. The process can include generating a random nonce, hashing a sequence of the random nonce and a secure key using a secure hash algorithm, scrambling the user's profile ID with a resulting hash code using a scrambling algorithm, and concatenating the random nonce with the scrambled profile ID to yield the secure cryptographic token. As long as the nonce is a random number each time a secure cryptographic token is generated, the value of any generated token value will always be unique, and yet resolvable to the user's profile ID using the same secret key. Moreover, since a new token is generated for each user computing device message or communication stream, no online entity will be able to identify the user.

According to another embodiment, an exemplary token-to-user resolution process is provided that includes receiving a token from an online entity, and processing the token with a secret key previously used to create the token to reveal a user profile ID.

According to a further embodiment, another exemplary secure cryptographic token generation process is provided. The process can include selecting a random number from a pre-generated sequence of random numbers, where each of the random numbers is associated with a unique ID, scrambling the user's profile ID with the selected random number using a scrambling algorithm, and concatenating the unique ID of the selected random number with the scrambled profile ID to yield the secure cryptographic token. In at least one embodiment, previously selected random numbers are not reused in generating subsequent secure cryptographic tokens for the same user.

According to one embodiment, another exemplary token-to-user resolution process is provided. The process can include receiving a token from an online entity, analyzing the token to identify an ID corresponding to a random number, retrieving the value of the random number from the pre-generated sequence of random numbers based on the identified ID, and unscrambling a user's profile ID embedded in the token using the retrieved random number.

Still other aspects and advantages of the present invention will in part be obvious and will in part be apparent from the specification.

The present invention accordingly comprises the several steps and the relation of one or more of such steps with respect to each of the others, and embodies features of construction, combinations of elements, and arrangement of parts adapted to effect such steps, all as exemplified in the detailed disclosure hereinafter set forth, and the scope of the invention will be indicated in the claims.

BRIEF DESCRIPTION OF THE DRAWINGS

For a fuller understanding of the invention, reference is made to the following description, taken in connection with the accompanying drawings, in which.

DETAILED DESCRIPTION OF THE PREFERRED EMBODIMENTS

Figure 1:
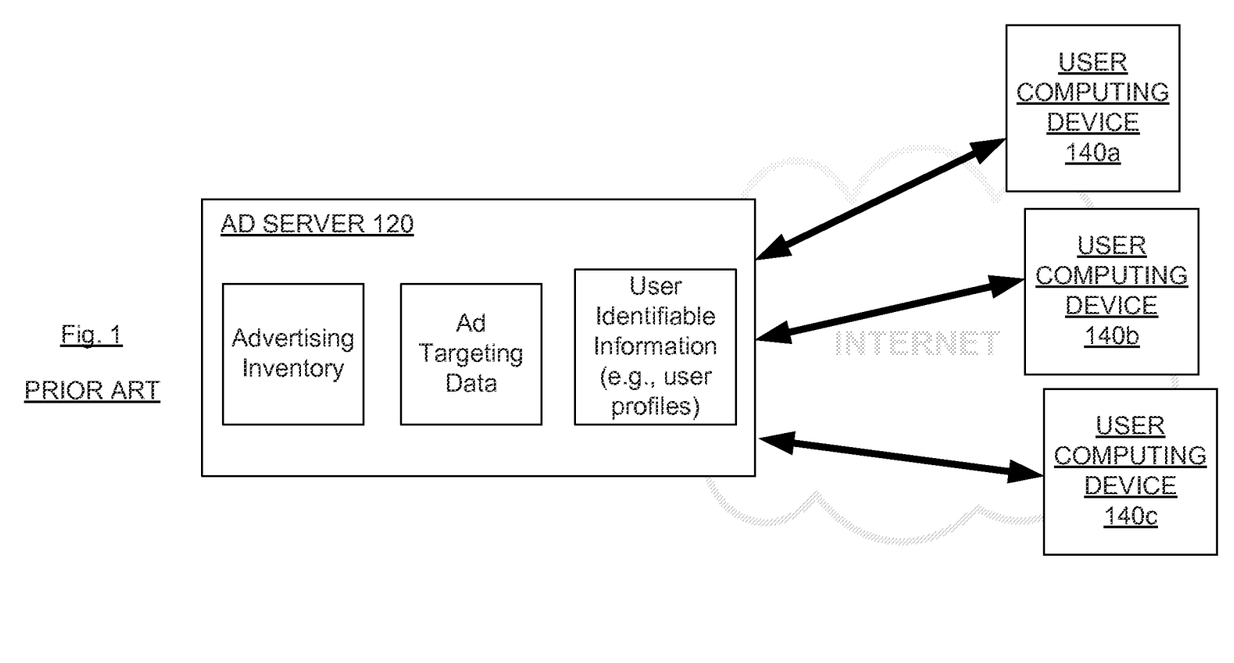
FIG. 1 is a schematic diagram depicting multiple user computing devices in communication with an ad server, according to the prior art.

A web site partnered with an advertiser (or advertising network/exchange) typically links its web pages to the advertiser's server (e.g., an ad server). Visitors to the site are thus required to connect to the site's own server as well as to the linked ad server. A schematic diagram depicting multiple user computing devices 140a-140c in communication with an ad server 120, according to the prior art, is illustrated in FIG. 1. As shown in FIG. 1, ad server 120 has a direct connection to each of computing devices 140a-140c over the Internet. It may establish these connections when the computing devices access one of its partnered web sites. Such an arrangement has drawbacks, however, since it exposes user identifiable information (e.g., the users' IP addresses, etc.) to the advertiser, and provides the advertiser with the unsolicited means to track (e.g., via cookies) and profile the users' online browsing habits and behaviors as ad targeting data.

According to preferred embodiments of the present invention, a user privacy protection system is provided that facilitates all communications between user computing devices and online entities (such as web sites, advertisers, and/or advertising networks or exchanges), and safeguards user identifiable information and ad targeting data from those entities. The protection system can be configured to intercept communications sent from user computing devices and directed to the entities, and process those communications to encrypt, or otherwise remove, all user identifiable information therein. The protection system can also be configured to transmit the processed communications to the intended entities, receive targeting data calls from those entities for ad targeting data associated with users of those computing devices, and provide at least a portion of such ad targeting data to the entities (e.g., when certain predefined conditions are met).

In at least one embodiment, the system can be implemented by one or more computing device platform servers. The platform server can be any server that can communicate with computing devices over the Internet, and can include one or more processors (e.g., microprocessors or other data processing devices) and memories (e.g., non-volatile memories, volatile memories, or both) and be equipped with one or more operating systems configured to execute software applications. As one example, the platform server can be a proxy server, such as a hypertext transfer protocol ("HTTP") proxy server, a socket secure ("SOCKS") proxy server, a secure sockets layer ("SSL") proxy server, or the like. As another example, the platform server can be part of a private network, such as a virtual private network ("VPN"). In various embodiments, the platform server can be owned, managed, and/or run by a provider (such as an industry association, a commercial security company, a government institution, an Internet Service Provider ("ISP")—ISPs, in particular, serve as gateways between their subscribers and the Internet, and are thus in a good position to safeguard their personal information—and the like) qualified to serve as an intermediary between users and advertisers. The ideal provider is one that abides by strict user privacy and security policies, and is trusted and respected by the public.

Figure 2:
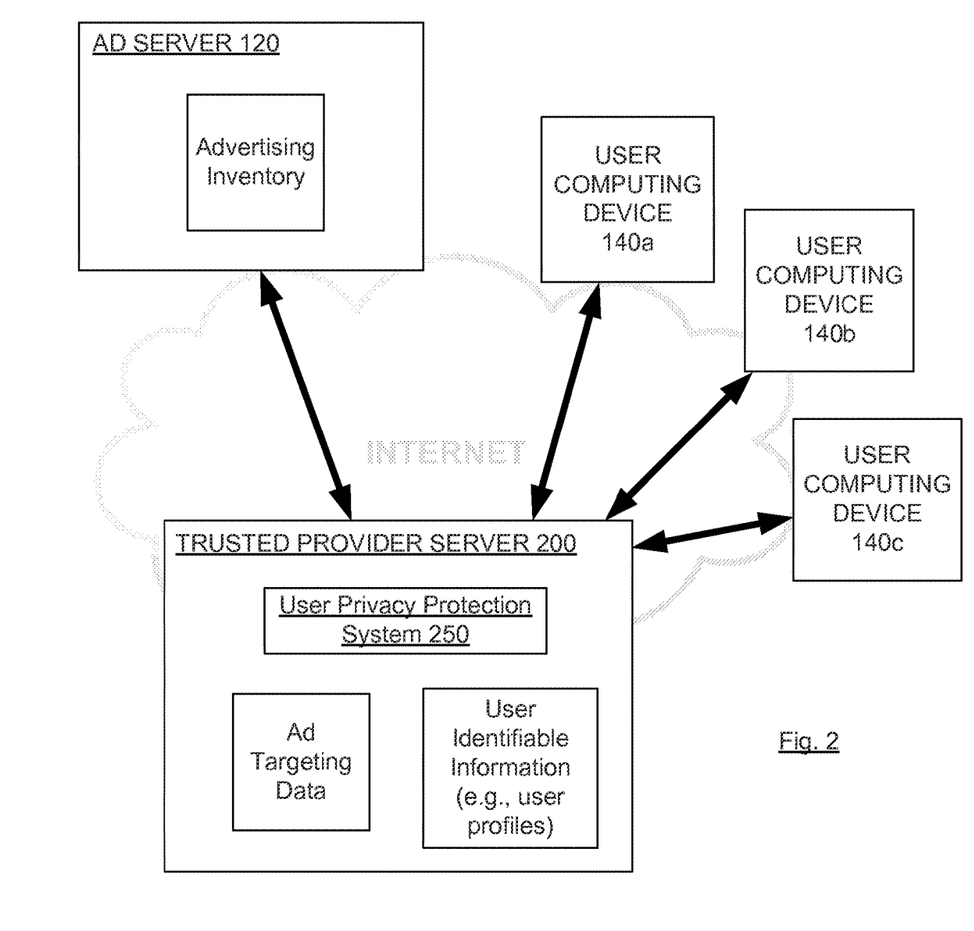
FIG. 2 is a schematic diagram depicting an exemplary trusted provider platform server interfacing with an ad server and multiple user computing devices, according to an embodiment of the present invention.

A schematic diagram depicting an exemplary trusted provider platform server 200 interfacing ad server 120 and user computing devices 140a-140c, according to an embodiment of the present invention, is illustrated in FIG. 2. As shown in FIG. 2, platform server 200 acts as a bridge (or a middleman) between ad server 120 and computing devices 140a-140c. Accordingly, all communications sent from computing devices 140a-140c and directed to ad server 120 first pass through platform server 200. Platform server 200 is additionally equipped with a user privacy protection system 250 configured to process such communications (e.g., by filtering, masking, or otherwise removing all user identifiable information therein) prior to delivery to ad server 120. In this way, ad server 120 is stripped from its ability to identify, track, and/or profile users, and thus has access only to its own advertising inventory—all user data, including user identifiable information and associated ad targeting data, is separately stored in (e.g., either locally in memory or remotely in one or more secure and accessible locations) and safeguarded by platform server 200. In various embodiments, ad server 120 can request platform server 200 for access to some or all of the user data for ad targeting purposes, but may be granted only limited access rights subject to predefined conditions (e.g., only upon user consent).

It is to be understood that, although FIG. 2 depicts the user identifiable information and the ad targeting data as being separate from one another, the ad targeting data can be included in the user identifiable information. That is, for example, ad targeting data corresponding to a user can be included as part of that user's profile.

For ease of identifying and/or communicating with user computing devices and ad servers, protection system 250 can create and administer appropriate user and online entity profiles.

In some embodiments, each user desiring to use the services of platform server 200 can be required to undergo an initial registration process with protection system 250. The user registration process can, for example, be triggered when protection system 250 is unable to identify the originating identity of an incoming connection request. During user registration, protection system 250 can prompt the user to provide personal or user identifiable information, such as the user's name, e-mail address, phone number, home address, and the like. Additionally, protection system 250 can also detect and store any identification information for the user's computing device(s) and/or ISP, such as a Media Access Control ("MAC") addresses and/or IP addresses. In some embodiments, protection system 250 can additionally request the user to provide ad targeting data, such as the user's age, gender, location, recent purchases, and the like. In these cases, protection system 250 can also prompt the user to identify and/or select any such ad targeting data that the user is comfortable granting third parties (such as advertisers) access to.

It is to be understood that, while protection system 250 can collect ad targeting data from users during user registration, it can additionally, or alternatively, be configured to monitor user activities over time to derive such data. For example, protection system 250 can monitor a user's browsing habits, online purchases, and the like, and determine the user's gender and interests therefrom.

Similarly, each online entity (e.g., ad server) desiring to accept platform server 200's role as an intermediary can also be required to register with the system. The online entity registration process can be similarly triggered when protection system 250 is unable to identify the originating identity of an incoming connection request. During entity registration, protection system 250 can prompt the entity to provide, or otherwise detect and collect, identification information, such as server addresses, domain names, and physical locations. In some embodiments, protection system 250 can additionally provide online entities with instructions (e.g., in the form of code) on appropriate procedures for communicating with platform server 200. These can, for example, include instructions on how processed communications sent by platform server 200 to the entities should be analyzed, and how requests for access to ad targeting data should be submitted to platform server 200.

Figure 3:
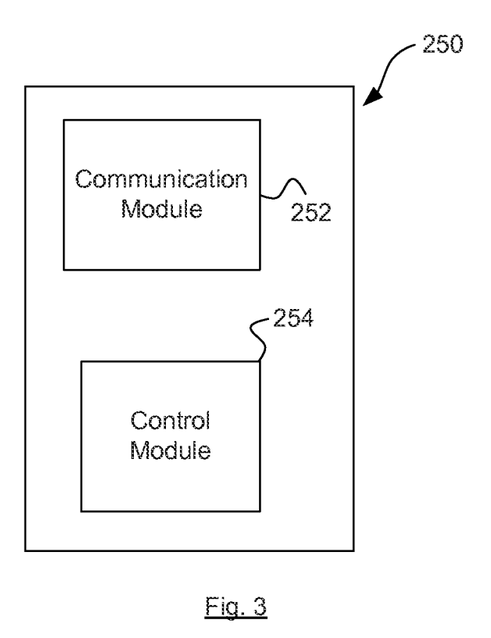
FIG. 3 is a schematic diagram of user privacy protection system, according to an embodiment of the present invention.

A schematic diagram of protection system 250, according to one embodiment, is illustrated in FIG. 3. Protection system 250 can include logic code, implemented in one or more modules, such as a communication module 252 and a control module 254. It is to be understood that, some or all of the modules in protection system 250 may be combined, and additional modules may be included to implement the system's various functions.

Communication module 252 can be configured to communicate with computing devices (e.g., any of computing devices 140a-140c) and servers (e.g., ad server 120) using one or more protocols. These can include HTTP or other similar stateless communication protocols, such as those pertaining to requests or messages sent by web browser applications or other Internet-related applications (e.g., audio, video, and gaming applications). In various embodiments, communication module 252 can also be configured to communicate over encrypted connections, which can ensure the security and privacy of communications sent between the various devices and servers. For example, communication module 252 can be configured to communicate over hypertext transfer protocol secure ("HTTPS"), encrypt communications using 128-bit SSL encryption, and/or establish SSL tunnels with user computing devices.

Control module 254 can be configured to analyze and/or process communications received by communication module 252. In at least one embodiment, control module 254 can be configured to analyze each communication sent by a user computing device to identify user identifiable information (e.g., names, e-mail addresses, state tracking information such as IP addresses, etc.) contained therein. Control module 254 can identify the user identifiable information in any suitable manner, such as by parsing the messages based on known models and/or layers of the underlying protocol(s) (e.g., the Open Systems Interconnection ("OSI") model and its various layers, such as the application, presentation, session, transport, network, data link, and physical layers). In various embodiments, control module 254 can also be configured to manipulate, or otherwise process, those communications to encrypt or remove, the user identifiable information therefrom. Communications that have been processed by control module 254 in this way can subsequently be transmitted by communication module 252 to the intended online entities.

It is to be understood that, in various embodiments, the processing (e.g., encryption or removal of user identifiable information) and/or sending of the processed communications can be implemented as a modification or on top of the underlying protocol of the original communication (e.g., on top of HTTP or other stateless communication protocols).

In at least one embodiment, communication module 252 can additionally be configured to receive targeting data calls from online entities requesting for access to ad targeting data. These calls can, for example, be sent by those entities after processed communications (e.g., those that have been manipulated by control module 254 to conceal the identities of the originating senders) have been delivered thereto. Each targeting data call can include a request for access to a taxonomy of ad targeting data, such as the corresponding user's recent purchases, intended purchases, recent search keywords or phrases, and the like. In some embodiments, a targeting data call can additionally include a request for access to personal information contained in the corresponding user's profile. Control module 254 can be configured to analyze targeting data calls, identify corresponding user ad targeting data (e.g., via lookup operations), and cause communication module 252 to provide the requesting entities access to at least portions thereof.

In at least one embodiment, an online entity (e.g., ad server 120) can be equipped with a complementary analytic system having one or more modules configured to receive processed communications from protection system 250, analyze the communications, and submit targeting data calls to the protection system. For example, ad server 120 can include one or more modules configured to receive processed web communications from platform server 200, identify unique values included in those processed communications, extract the unique values therefrom, and transmit targeting data calls (each including corresponding ones of the extracted values as return values) to platform server 200 for ad targeting data retrieval.

In various embodiments, control module 254 can restrict an online entity's right to access any user's ad targeting data. For example, control module 254 can be configured to determine whether a user (who is the target of a targeting data call) consents to the online entity's access to the user's ad targeting data. Consent can be determined in any number of ways. As one example, control module 254 can examine the user's profile to determine whether the user has previously consented (e.g., during user registration) to such access. Alternatively, control module 254 can query the user for consent in real-time, such as by sending a consent request to the user's computing device or an agent thereof. For example, control module 254 can instruct communication module 252 to cause the user's computing device to display a consent inquiry (e.g., by causing the user's computing device to present a window or message) requesting approval or disapproval of access rights to the user's ad targeting data. In some embodiments, the consent inquiry can include a list of ad targeting data (such as age, gender, location, hobbies, recent purchases, etc.), along with an instruction prompting the user to select the item(s) that the user wishes to grant access to, or otherwise select an option that restricts all access thereto. Once a response is received from the user, control module 254 can allow or deny the online entity access to the ad targeting data accordingly. For example, if the user conditionally consents (e.g., by allowing only access to some of the user's ad targeting data), control module 254 can retrieve only the approved ad targeting data, and cause communication module 252 to transmit the retrieved data to the advertiser. As another example, if the user fully consents (e.g., allowing access to the entirety of the user's ad targeting data), control module 254 can retrieve all the user's ad targeting data, and cause communication module 252 to transmit that data to the advertiser. As yet another example, if the user refuses to grant access to any of the user's ad targeting data, control module 254 can either not respond to the online entity's targeting data call, or notify the entity that access thereto is denied.

It is to be understood that platform server 200 can include one or more servers, and protection system 250 can be implemented (in whole or in part) by some or all of these servers. It is also to be understood that protection system 250 can be implemented in other forms. For example, in an alternative embodiment, protection system 250 can be implemented as a local agent or a script (e.g., a web browser extension installed on the user's computing device) that monitors the user's activity on a web browser application or other Internet-enabled application. This obviates the need for an intermediary server or network between the user's computing device and online entities. In this case, however, certain identifying information, such as IP addresses, may not be removed or hidden from those entities, since all communications from the user's computing device would be sent directly to the intended entities.

Turning now to protection system 250's processing and/or encryption of communications received from user computing devices, various novel techniques can be employed to ensure that user identifiable information is hidden or removed therefrom, prior to transmission to intended online entities.

In various embodiments, control module 254 can be configured to embed or include a unique value, such as a secure cryptographic token, in each communication received from a user computing device. The secure cryptographic token can, for example, include a sequence of data that is unique for each received communication, and can be created by using a cryptographic algorithm, a secret key (e.g., a hidden secure key), and user data, such as the user's profile ID. Control module 254 can also correlate (e.g., in a lookup table) the created token with that user data for future reference. This results in an "opaque" communication that nevertheless includes user identifiable information (e.g., the user's profile ID), albeit masked by a secure encrypted value. Since control module 254 remains the sole master of the secret key, which is required to unlock the secure token, only protection system 250 (or more generally, platform server 200) can resolve the token to the user's profile ID.

When the intended online entity (e.g., ad server) receives the processed communication including such a secure token, it can extract the token therefrom and include it in its targeting data call to communication module 252. In response, control module 254 can identify the returned token, resolve it using the secret key, and look up the corresponding user profile ID to identify the target user. As long as the user consents to the entity's access to the user's ad targeting data (e.g., as dictated in the user's profile or as determined in real-time, as described above), control module 254 can cause communication module 252 to transmit some or all of that ad targeting data to the entity accordingly. Again, since only ad targeting data (such as age, gender, recent or intended purchases, etc.), and not any personally identifiable information (such as name, address, or IP address) is sent to the entity, the entity has no way of identifying or tracking the user's online activities, but will nevertheless be able to target highly relevant ads to that user.

Figure 4:
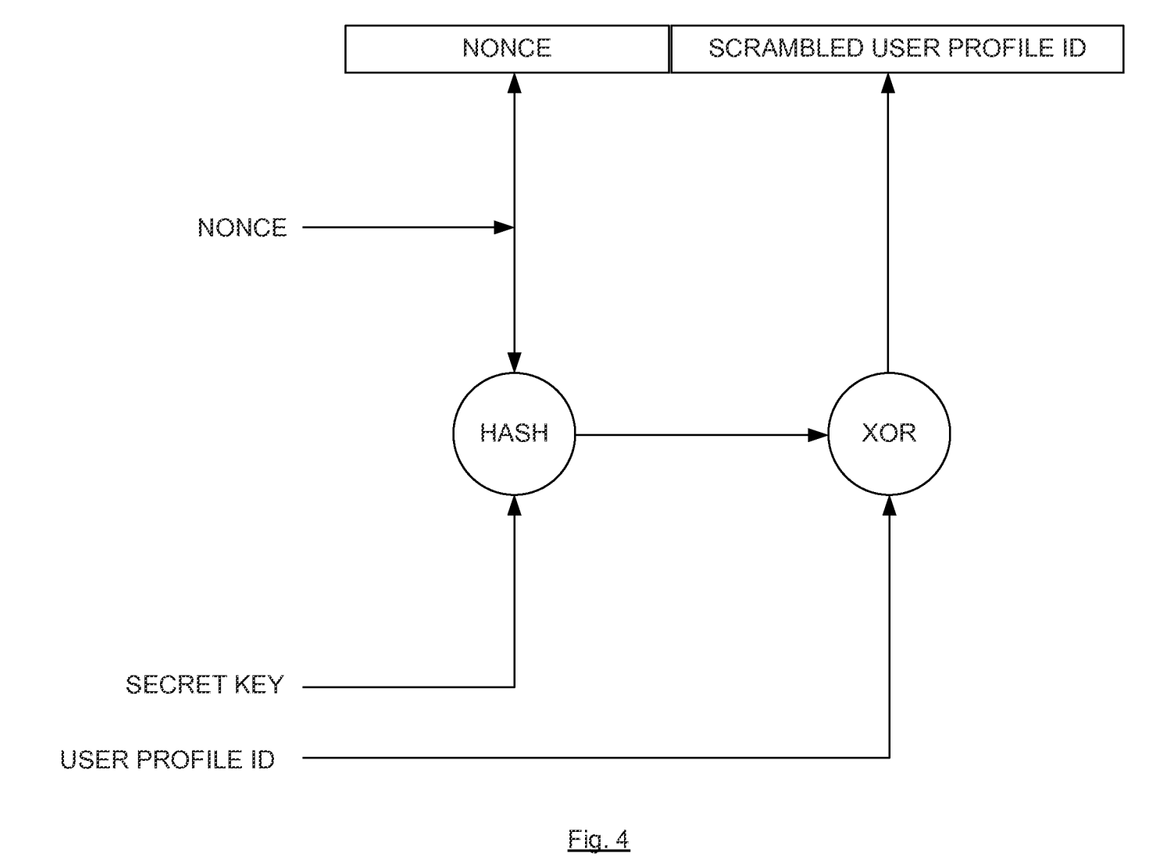
FIG. 4 depicts an example of a process for generating a secure cryptographic token using a secure hash algorithm, according to an embodiment of the present invention.
Figure 5A:
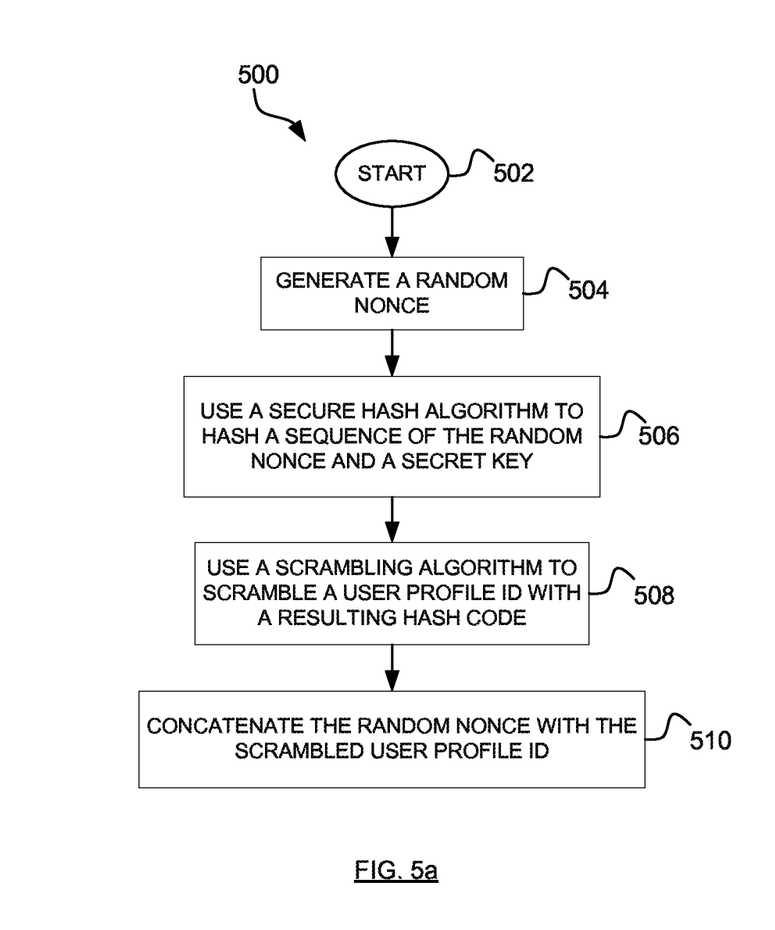
FIG. 5a is a flowchart showing an exemplary secure cryptographic token generation process, according to an embodiment of the present invention.

In various embodiments, protection system 250, and more particularly control module 254, can generate secure cryptographic tokens using secure hash algorithms. An example of a process for generating a secure cryptographic token using a secure hash algorithm, according to one embodiment, is depicted in FIG. 4. A complementary flowchart showing an exemplary secure cryptographic token generation process 500, according to one embodiment, is also depicted in FIG. 5a, beginning at step 502. As shown in FIG. 5a, the process for generating a secure token includes generating a random nonce (e.g., a number or bit string used only once) (step 504), hashing a sequence of the random nonce and a secure key (e.g., known only to the protection system) using a secure hash algorithm (e.g., SHA-1, SHA-256, SHA-512, or any other hashing algorithm with similar or equivalent functionality) (step 506), scrambling the user's profile ID with a resulting hash code using a scrambling algorithm (e.g., using a bitwise exclusive OR function, or any other reversible scrambling algorithm with similar or equivalent functionality) (step 508), and concatenating the random nonce with the scrambled profile ID to yield the secure cryptographic token (step 510). As long as the nonce is a random number each time a secure cryptographic token is generated, the value of any generated token value will always be unique, and yet resolvable to the user's profile ID using the same secret key. Moreover, since a new token is generated for each user computing device message or communication stream, no online entity (e.g., ad server) will be able to identify the user.

Figure 5B:
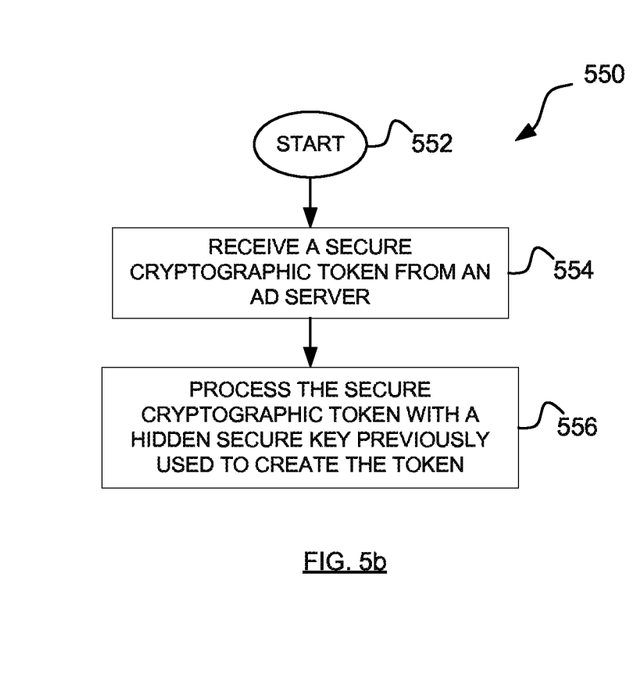
FIG. 5b is a flowchart showing an exemplary token-to-user resolution process, according to an embodiment of the present invention.

A flowchart showing an exemplary token-to-user resolution process 550, according to one embodiment, is depicted in FIG. 5b, beginning at step 552. At step 554, a token (e.g., created using process 500) is received from an online entity (e.g., an ad server). At step 556, the token is processed with a secret key (e.g., known only to the protection system) previously used to create the token to reveal a user profile ID.

Figure 6A:
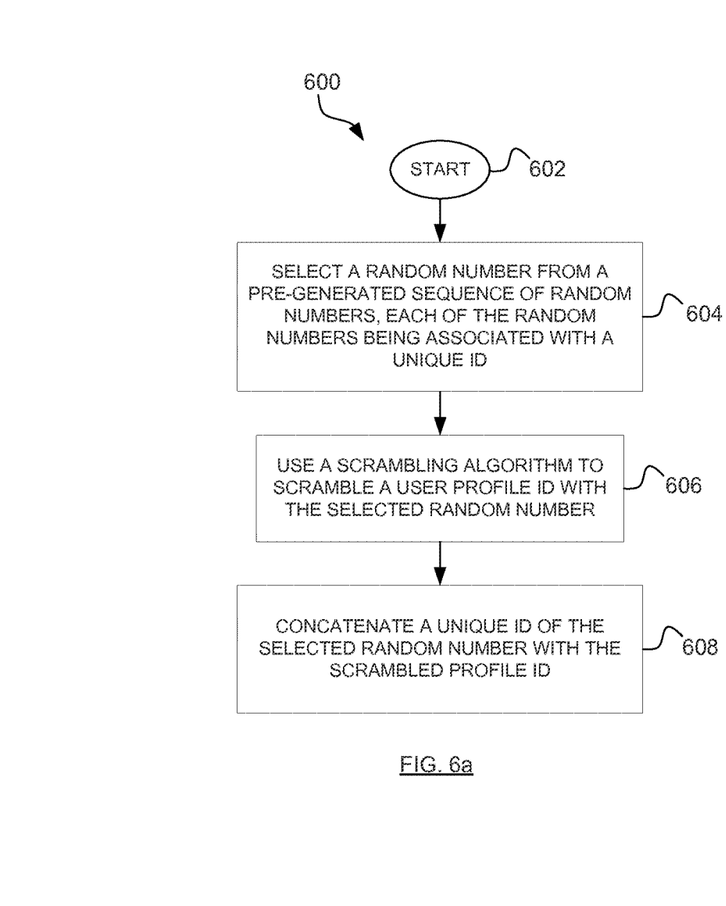
FIG. 6a is a flowchart showing another exemplary secure cryptographic token generation process, according to an embodiment of the present invention.

A flowchart showing another exemplary secure cryptographic token generation process 600, according to one embodiment, is depicted in FIG. 6a, beginning at step 602. As shown in FIG. 6a, the process for generating a secure token includes selecting a random number from a pre-generated sequence of random numbers, where each of the random numbers is associated with a unique ID (step 604), scrambling the user's profile ID with the selected random number using a scrambling algorithm (e.g., using a bitwise exclusive OR function, or any other reversible scrambling algorithm with similar or equivalent functionality) (step 606), and concatenating the unique ID of the selected random number with the scrambled user profile ID to yield the secure cryptographic token (step 608). In at least one embodiment, the protection system can also be configured to avoid reusing previously selected random numbers in generating subsequent secure cryptographic tokens for the same user.

Figure 6B:
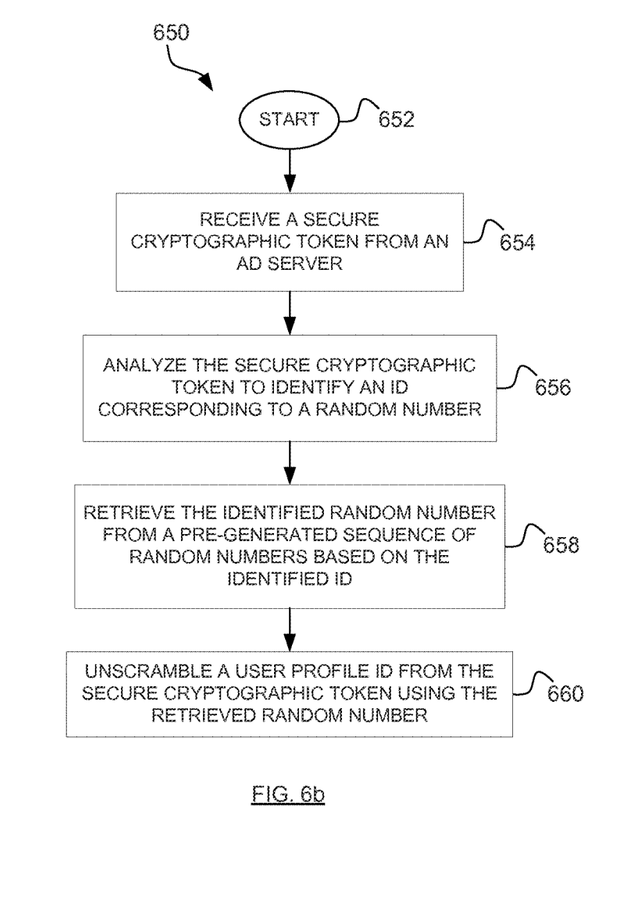
FIG. 6b is a flowchart showing another exemplary token-to-user resolution process, according to an embodiment of the present invention.

A flowchart showing an exemplary token-to-user resolution process 650, according to one embodiment, is depicted in FIG. 6b, beginning at step 652. At step 654, a token (e.g., created using process 600) is received from an online entity (e.g., an ad server). At step 656, the token is analyzed to identify an ID corresponding to a random number. At step 658, the value of the random number is retrieved from the pre-generated sequence of random numbers based on the identified ID, and at step 660, the retrieved random number is used to unscramble a user's profile ID embedded in the token.

It is to be understood that, in any of processes 500 and 600, other information regarding the user can be used in addition to, or as a substitute for, the user profile ID. For example, the user's IP address, a MAC address of the user's computing device, the user's driver's license number, passport number, birthdate, social security number, a combination of any of these, or any other similar identifying information can be used.

Figure 7:
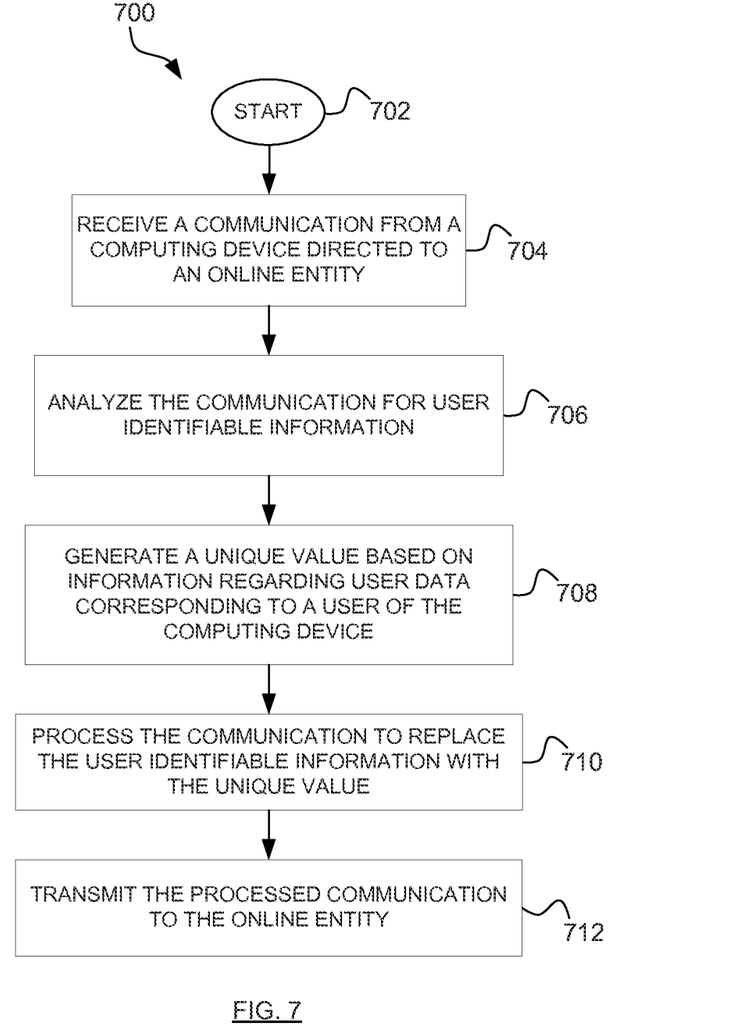
FIG. 7 is a flowchart showing an exemplary process implemented by a user privacy protection system, according to an embodiment of the present invention.

FIG. 7 is a flowchart showing an exemplary process 700 implemented by a user privacy protection system (e.g., protection system 250), involving communications between a computing device and an online entity, wherein a user of the computing device is registered with the system for safeguarding of user data (e.g., user profile and/or ad targeting data). Process 700 can begin at step 702. At step 704, a communication from a computing device directed to an online entity is received. For example, a communication from computing device 140a directed to ad server 120 can be received at communication module 252. At step 706, the communication can be analyzed for user identifiable information. For example, control module 254 can analyze the communication for user identifiable information, such as an IP address. At step 708, a unique value can be generated based on information regarding the user data. For example, control module 254 can generate a unique value (e.g., using any of processes 500 and 600) using a user profile ID associated with the user's data. At step 710, the communication can be processed to replace the user identifiable information with the unique value. For example, control module 254 can process the communication and replace the IP address with the secure cryptographic token. At step 712, the processed communication can be transmitted to the online entity. For example, control module 254 can cause communication module 252 to transmit the processed communication to ad server 120.

It should be understood that the steps shown in processes 500, 550, 600, 650, and 700 are merely illustrative and that existing steps may be modified or omitted, additional steps may be added, and the order of certain steps may be altered. In some particular embodiments, multiple steps shown as sequential in this specification may be performed at the same time.

It should also be understood that the foregoing subject matter may be embodied as devices, systems, methods and/or computer program products. Accordingly, some or all of the subject matter may be embodied in hardware and/or in software (including firmware, resident software, microcode, state machines, gate arrays, etc.). It should additionally be understood that, in embodiments of the present invention, any suitable programming language may be used to implement the routines of particular embodiments including C, C++, Java, JavaScript, Python, Ruby, CoffeeScript, assembly language, etc. Different programming techniques may be employed such as procedural or object oriented. The routines may execute on a single processing device or multiple processors. Moreover, the subject matter may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate or transport the program for use by or in connection with the instruction execution system, apparatus, or device.

The computer-usable or computer-readable medium may be for example, an electronic, magnetic, optical, electromagnetic, infrared, or semiconductor system, apparatus, device, or propagation medium. Computer-readable media may comprise computer storage media and communication media.

Computer storage media includes volatile and nonvolatile, removable and non-removable media implemented in any method or technology for storage of information such as computer-readable instructions, data structures, program modules or other data. Computer storage media includes RAM, ROM, EEPROM, flash memory or other memory technology that can be used to store information and that can be accessed by an instruction execution system.

Communication media typically embodies computer-readable instructions, data structures, program modules or other data in a modulated data signal such as a carrier wave or other transport mechanism and includes any information delivery media (wired or wireless). A modulated data signal can be defined as a signal that has one or more of its characteristics set or changed in such a manner as to encode information in the signal.

When the subject matter is embodied in the general context of computer-executable instructions, the embodiment may comprise program modules, executed by one or more systems, computers, or other devices. Generally, program modules include routines, programs, objects, components, data structures and the like, which perform particular tasks or implement particular abstract data types. Typically, the functionality of the program modules may be combined or distributed as desired in various embodiments.

It will thus be seen that the objects set forth above, among those made apparent from the preceding description and the accompanying drawings, are efficiently attained and, since certain changes can be made in carrying out the above methods and in the constructions set forth for the systems without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. A user privacy protection method, involving communications between a computing device and an online entity, a user of the computing device being registered with at least one computing device platform server for safeguarding of user data, the method comprising:
   receiving, at the at least one computing device platform server, a communication from the computing device directed to the online entity;
   analyzing, using the at least one computing device platform server, the communication for user identifiable information;

generating, using the at least one computing device platform server, a unique value based on information associated with the user data;

processing, using the at least one computing device platform server, the communication to replace the user identifiable information with the unique value; and transmitting, using the at least one computing device platform server, the processed communication to the online entity, wherein the unique value comprises a secure cryptographic token, wherein the information associated with the user data comprises a user profile ID, and wherein generating comprises:

generating a random nonce;

using a secure hash algorithm to hash a sequence of the random nonce and a secret key;

using a scrambling algorithm to scramble the user profile ID with a resulting hash code; and concatenating the random nonce with the scrambled user profile ID.

2. The method of claim 1, wherein the secure hash algorithm comprises one of SHA-1, SHA-256, and SHA-512.

3. The method of claim 1, wherein the scrambling algorithm comprises binary exclusive OR.

4. A user privacy protection method, involving communications between a computing device and an online entity, a user of the computing device being registered with at least one computing device platform server for safeguarding of user data, the method comprising:

receiving, at the at least one computing device platform server, a communication from the computing device directed to the online entity;

analyzing, using the at least one computing device platform server, the communication for user identifiable information;

generating, using the at least one computing device platform server, a unique value based on information associated with the user data;

processing, using the at least one computing device platform server, the communication to replace the user identifiable information with the unique value; and transmitting, using the at least one computing device platform server, the processed communication to the online entity, wherein the unique value comprises a secure cryptographic token, wherein the information associated with the user data comprises a user profile ID, and wherein generating comprises:

selecting a random number from a pre-generated sequence of random numbers;

using a scrambling algorithm to scramble the user profile ID with the selected random number; and concatenating a unique ID of the selected random number with the scrambled profile ID.

5. The method of claim 4, wherein the selected random number has not previously been used to generate a secure cryptographic token.

6. The method of claim 4, wherein the scrambling algorithm comprises binary exclusive OR.

7. A user privacy protection system, involving communications between computing devices and online entities, each user of each computing device being registered with the system for safeguarding of their user data, the system comprising:

a memory configured to store the user data;

a communication module configured to transmit and receive communications to and from the computing devices and online entities; and a control module configured to, for each communication received at the communication module from one of the computing devices and directed to one of the online entities:

analyze the communication for user identifiable information;

generate a unique value based on information associated with the user data corresponding to that computing device;

process the communication to replace the user identifiable information with the unique value; and cause the communication module to transmit the processed communication to that online entity, wherein the unique value comprises a secure cryptographic token, wherein the information associated with the user data comprises a user profile ID, and wherein the control module is configured to generate the secure cryptographic token by:

generating a random nonce;

using a secure hash algorithm to hash a sequence of the random nonce and a secret key;

using a scrambling algorithm to scramble the user profile ID with a resulting hash code; and concatenating the random nonce with the scrambled user profile ID.

8. The system of claim 7, wherein the secure hash algorithm comprises one of SHA-1, SHA-256, and SHA-512.

9. The system of claim 7, wherein the scrambling algorithm comprises binary exclusive OR.

10. A user privacy protection system, involving communications between computing devices and online entities, each user of each computing device being registered with the system for safeguarding of their user data, the system comprising:

a memory configured to store the user data;

a communication module configured to transmit and receive communications to and from the computing devices and online entities; and a control module configured to, for each communication received at the communication module from one of the computing devices and directed to one of the online entities:

analyze the communication for user identifiable information;

generate a unique value based on information associated with the user data corresponding to that computing device;

process the communication to replace the user identifiable information with the unique value; and cause the communication module to transmit the processed communication to that online entity, wherein the unique value comprises a secure cryptographic token, wherein the information associated with the user data comprises a user profile ID, and wherein the control module is configured to generate the secure cryptographic token by:

selecting a random number from a pre-generated sequence of random numbers;

using a scrambling algorithm to scramble the user profile ID with the selected random number; and concatenating a unique ID of the selected random number with the scrambled profile ID.

11. The system of claim 10, wherein the selected random number has not previously been used to generate a secure cryptographic token.

12. The system of claim 10, wherein the scrambling algorithm comprises binary exclusive OR.

\* \* \* \* \*